US010633000B2

(12) United States Patent
Pandit et al.

(10) Patent No.: US 10,633,000 B2
(45) Date of Patent: Apr. 28, 2020

(54) TRANSFERRING TORQUE DURING A DRIVELINE SYSTEM ERROR

(71) Applicant: GKN Automotive Ltd., Redditch, Worcestershire (GB)

(72) Inventors: Chinmay Milind Pandit, Ann Arbor, MI (US); Himanshu Rakesh Mehta, Auburn Hills, MI (US); Mohit Shrivastava, Royal Oak, MI (US)

(73) Assignee: GKN Automotive Limited, Birmingham (GB)

( * ) Notice: Subject to any disclaimer, the term of this patent is extended or adjusted under 35 U.S.C. 154(b) by 195 days.

(21) Appl. No.: 15/814,841

(22) Filed: Nov. 16, 2017

(65) Prior Publication Data

US 2019/0143978 A1 May 16, 2019

(51) Int. Cl.

*B60W 30/188* (2012.01)
*B60W 10/119* (2012.01)
*B60W 50/00* (2006.01)

(52) U.S. Cl.

CPC ...... *B60W 30/1888* (2013.01); *B60W 10/119* (2013.01); *B60W 2050/0008* (2013.01); *B60W 2510/0657* (2013.01); *B60W 2540/04* (2013.01)

(58) Field of Classification Search

CPC ............... B60W 10/119; B60W 10/14; B60W 30/1888; B60W 2050/0008; B60W 50/0205; B60W 50/0225; B60W 50/029
See application file for complete search history.

(56) References Cited

U.S. PATENT DOCUMENTS 5,032,995 A 7/1991 Matsuda et al.
5,314,038 A * 5/1994 Peterson, Jr. .......... A01B 67/00 180/274
8,396,633 B2 3/2013 Buszek
2005/0283303 A1* 12/2005 Katrak .................. B60W 10/06 701/114
2014/0297145 A1* 10/2014 Nihanda ............ B60K 23/0808 701/69
2017/0113545 A1* 4/2017 Imafuku ............ B60K 23/0808

* cited by examiner

*Primary Examiner* — Edwin A Young
(74) *Attorney, Agent, or Firm* — Bejin Bieneman PLC

(57) ABSTRACT

A system is described, as well as methods of using the system. The method includes: determining an error within the vehicle driveline system; following the error, determining that a state of a power take-off unit (PTU) within the system is determinable; and then transferring a normal torque from the PTU to a secondary drive unit (SDU) during the error.

21 Claims, 5 Drawing Sheets

12
10
14
16
24
64
42
44
34a
34
82
80
34b
38
28
20
50
70
46
22
40
48
36a
36
36b
26

12
24
64
86
50
26
84
22
40
70
52
62
60
56
58
54
68
66

300 continued

405
PTU state determinable?
No
Yes

410
State of PTU actuator?
Disengaged

Engaged
425
415
Deliver normal torque ($\tau_{NORM}$) to SDU
No
Change from AWD mode to 2WD mode?
Yes
420

Control SDU actuator to disengaged state 300 continued 330
505
Torque
transfer error
at SDU?
No 315
Yes
515
Actuate clutch to
disengaged state
520
Latched
or unlatched
error type?
Unlatched 325
Latched
525
Actuate PTU to
disengaged state
END

TRANSFERRING TORQUE DURING A DRIVELINE SYSTEM ERROR

BACKGROUND

In two-wheel drive vehicles, a powertrain system of a vehicle may be coupled to one drive axle to deliver torque to the wheels thereof. In at least some all-wheel drive vehicles, a second drive axle selectively may be engaged so that, when engaged, torque can be delivered to four wheels rather than just two wheels. When the powertrain system experiences an error during all-wheel drive, the second drive axle may be delivered less torque; and this torque reduction can be a problem.

DETAILED DESCRIPTION

Figure 1:
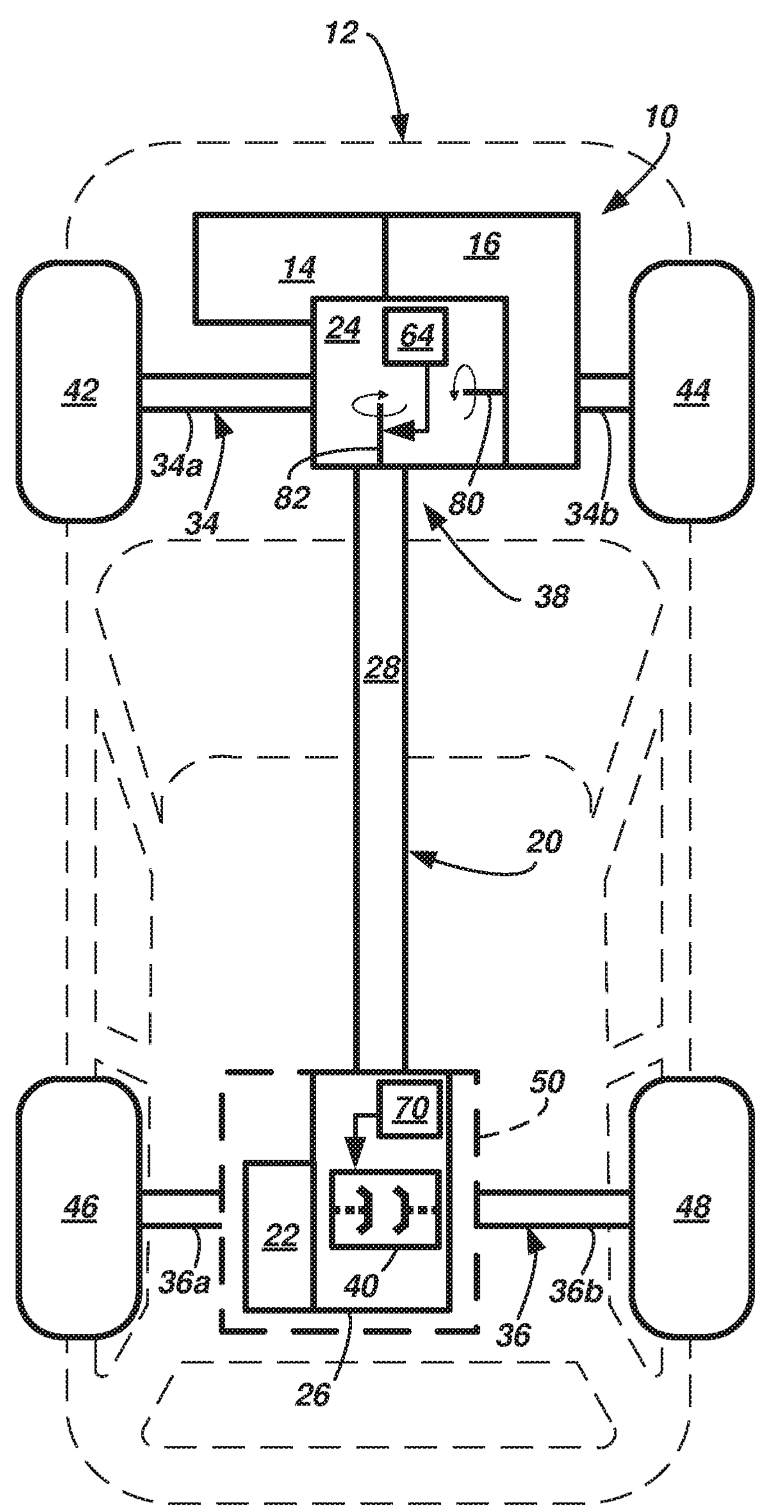
FIG. 1 is a schematic view of a vehicle powertrain system.

A powertrain system for a vehicle is described that includes a vehicle driveline system; one or more methods of using the vehicle driveline system(s) are also described. According to one illustrative example, a method for controlling a vehicle driveline system includes: determining an error within the system; following the error, determining that a state of a power take-off unit (PTU) within the system is determinable; and then transferring a normal torque from the PTU to a secondary drive unit (SDU) during the error.

According to at least one example of the method, the error occurs at the PTU.

According to at least one example of the method, the method further comprises: prior to transferring the normal torque, determining the state of the PTU, wherein the state comprises one of an engaged state or a disengaged state.

According to at least one example of the method, the method further comprises: determining that the state is determinable based on determining that the error is a position error at the PTU or a power draw error at the PTU.

According to at least one example of the method, the method further comprises: determining that the state of the PTU is an engaged state; and then controlling the PTU to transfer the normal torque to the SDU.

According to at least one example of the method, controlling the PTU to the transfer the normal torque to the SDU comprises at least one of: outputting from a computer a torque reduction override instruction, or controlling an actuator at the PTU to deliver the normal torque.

According to at least one example of the method, the method further comprises: after determining the error, transferring the normal torque to the SDU, based at least in part on electronic traction control sensing.

According to at least one example of the method, the method further comprises: after determining the error, receiving an indication of a driver input to change to a two-wheel drive (2WD) mode; and then controlling an actuator of the SDU to change to the 2WD mode.

According to another example, a system is described that comprises: a computer, comprising a processor and memory storing instructions executable by the processor, the instructions comprising, to: determine an error within the system; and following the error, when a state of a power take-off unit (PTU) is determinable, then transfer a normal torque from the PTU to a secondary drive unit (SDU) during the error.

According to at least one example of the system, the error occurs at the PTU.

According to at least one example of the system, the instructions further comprise: prior to transferring the normal torque, to determine the state of the PTU, wherein the state comprises one of an engaged state or a disengaged state.

According to at least one example of the system, the instructions further comprise, to: determine that the state of the PTU is an engaged state; and then control the PTU to transfer the normal torque to the SDU.

According to at least one example of the system, controlling the PTU to the transfer the normal torque to the SDU further comprises at least one of the instructions, to: output a torque reduction override instruction, or control an actuator at the PTU to transfer the normal torque.

According to at least one example of the system, the instructions further comprise, to: receive an indication of electronic traction control sensing; and after determining the error, transfer the normal torque to the SDU, based, at least in part, on the sensing.

According to at least one example of the system, the instructions further comprise, to: receive an indication of a driver input to change to a two-wheel drive (2WD) mode; and then control an actuator of the SDU to change to the 2WD mode.

According to at least one example of the system, the instructions further comprise, to: prior to determining that the error occurred within the system, determine whether the error was a system level error; and when the error is a system level error, then suspend use of the SDU.

According to at least one example of the system, the instructions further comprise, to: suspend use of the SDU for a remainder of a current ignition cycle when a type of the error is a latched error type; and provided the error is first cleared, suspend use of the SDU for a portion of the current ignition cycle when the type of the error is an unlatched error type.

According to another example, a vehicle driveline system is described that comprises: a secondary drive unit (SDU); and a computer, comprising a processor and memory storing instructions executable by the processor, the instructions comprising, to: determine an origin of an error in the vehicle driveline system; when the origin of the error occurs in a power take-off unit (PTU), then determine that a state of the PTU is determinable; and when the state of the PTU is determinable, then transfer a normal torque from the PTU to the SDU during the error.

According to at least one example of the system, the instructions further comprise, to: when the origin of the error occurs in the SDU, then disengage a clutch of the SDU; determine a type of the error is one of a latched type error or an unlatched type error; and when the type is the latched type error, then actuate the PTU to a disengaged state so that a drive shaft of the system is not driven by the PTU while the clutch is disengaged.

According to at least one example of the system, transferring the normal torque to the SDU further comprises at least one of the following instructions: to output from the computer a torque reduction override instruction, or to control an actuator at the PTU to deliver the normal torque.

Now turning to the figures, wherein like numerals indicate like parts throughout the several views, there is shown a powertrain system 10 for a vehicle 12 that includes an engine 14, a gearing system 16 (e.g., such as a transaxle), and a driveline system 20 which may comprise a computer 22 and a power take-off unit (PTU) 24 (e.g., also called a power transfer unit) coupled to the gearing system 16 and also to a secondary drive unit (SDU) 26 via a drive shaft 28. The vehicle 12 further may comprise a primary axle 34 driven by the engine 14 and gearing system 16 and a secondary axle 36 selectively driven by the engine 14 and gearing system 16 via the driveline system 20. The description below and the accompanying illustrations show primary axle 34 as a front drive axle of vehicle 12 and secondary axle 36 as a drive rear axle thereof; however, this is not required (for instance, in other examples, the secondary axle 36 could be located forward of primary axle 34).

According to at least one example, the driveline system 20 includes an active disconnect arrangement 38. As used herein, an active disconnect arrangement means that the PTU 24 may be disengaged or decoupled mechanically from drive shaft 28 (thereby decoupling the secondary axle 36) based on at least one of: electronic sensing of traction-control conditions and determining that the conditions are no longer suitable for four-wheel drive or all-wheel drive use, or a user actuation to a two-wheel drive mode (e.g., switching the vehicle 12 from a four-wheel or all-wheel drive mode to the two-wheel drive mode). Thus, when the active disconnect arrangement is in a disengaged state, the PTU 24 no longer drives the drive shaft 28 and ceases delivering rotational energy to both the drive shaft 28 and the SDU 26. As used herein, four-wheel drive (4WD) means torque is delivered to each wheel and the torque delivery at each respective wheel, if suitable, may differ between each of the respective wheels, and as used herein, all-wheel drive (AWD) means that torque is delivered to each wheel; however, the torque delivery at each wheel may or may not differ between each of the respective wheels on vehicle 12 (e.g., thus, four-wheel drive systems may be classified as a subset of all-wheel drive systems, but the reverse is not necessarily true).

Conversely, driveline systems having a passive disconnect arrangement may disconnect the secondary axle 36 using a clutch 40 (described more below) located at the secondary axle 36. For example, in the passive disconnect arrangement, the PTU 24 may remain coupled to the drive shaft 28 and may continue to rotate shaft 28 even though the SDU 26 is disengaged from the drive shaft 28 at the clutch 40. Under certain conditions, the powertrain system 10 described below can disengage the drive shaft 28 from the PTU 24 thereby conserving energy and improving fuel economy—e.g., when compared to passive disconnect arrangements and other instances wherein the drive shaft 28 is being driven by the PTU 24 but the SDU 26 is disengaged from the shaft 28.

In addition, as discussed below, the powertrain system 10 can determine to transfer normal torque to the SDU 26 even when a driveline error is determined (within the driveline system 20). For example, typically a PTU having an active disconnect arrangement (such as arrangement 38) is programmed to reduce torque transfer from the PTU 24 to the SDU 26 when an error is detected at the PTU 24. In this manner, damage to one or more mechanical components of the PTU 24, the SDU 26, or both may be prevented or minimized. Here, in at least some examples, computer 22 may be programmed to evaluate (quantitatively, qualitatively, or both) the error, and based on the evaluation, computer 22 may cause PTU 24 to transfer normal torque ($\tau_{NORM}$) to the SDU 26 via drive shaft 28 (e.g., instead of reducing torque transfer). Thus, based on the evaluation, damage is minimized, as normal torque is transferred—thereby improving the user driving experience. As used herein, an error is a fault or malfunction of mechanical components, electrical components, or both detectable using electronic sensor(s). As used herein, the phrases 'based on' or 'in response to' mean that there is a causal relationship between a condition precedent and a determined-condition (or computer action) subsequent; e.g., in some instances, because computer 22 quantitatively and/or qualitatively evaluated an error at the PTU 24, computer 22 determined and caused a normal torque transfer to occur at the secondary axle 36. This will be explained in greater detail below.

As used herein, a transferring (or delivering) of a normal torque ($\tau_{NORM}$) to the SDU 26 means transferring, from the PTU 24, a determined or predetermined quantity of torque which the PTU 24 otherwise would transfer to the SDU 26 in an absence of a PTU error or in an absence of a PTU diagnostic trouble code (DTC). For example, during normal operation, the PTU 24 may transfer one of a plurality of quantities of torque ($\tau_{NORM}$1, $\tau_{NORM}$2, $\tau_{NORM}$3, etc.) to the SDU 26; normal torque delivery includes delivering these typical quantities, not reducing these respective quantities by some amount (e.g., $\tau_{NORM}$1*50%, $\tau_{NORM}$2*50%, $\tau_{NORM}$3*50%, etc., wherein the reduction of 50% is merely illustrative—e.g., at least some of the reductions may have different percentages or values).

Exemplary vehicle 12 and powertrain system 10 are described below. Thereafter, an exemplary computer process will be described—e.g., illustrating executable instructions of computer 22 used to control the driveline system 20.

In FIG. 1, vehicle 12 is shown as a passenger car; however, vehicle 12 could also be a truck, sports utility vehicle (SUV), recreational vehicle, bus, or any other suitable vehicle that comprises the powertrain system 10. The powertrain system 10 may be carried by a frame, a unibody, etc. of the vehicle 12—e.g., in accordance with techniques known in the art.

The primary and secondary axles 34, 36 of vehicle 12 may be coupled to wheels 42, 44, 46, 48. More particularly, primary axle 34 may comprise halfshafts 34*a*, 34*b* which are coupled to wheels 42, 44, respectively. And secondary axle 36 may comprise halfshafts 36*a*, 36*b* which are coupled to wheels 46, 48, respectively. In this manner, wheels 42-48 may rotate independent of one another and/or at different rates of speed.

In at least the illustrated example, the primary axle 34 is located forward of secondary axle 36, and primary axle 34 is coupled directly to gearing system 16. Correspondingly, secondary axle 36 is coupled indirectly to gearing system 16 via PTU 24, drive shaft 28, and SDU 26 (e.g., which includes clutch 40). Again, this arrangement is merely an example; other arrangements exist including those wherein the secondary axle is located vehicle forwardly of the primary axle, wherein the engine 14 and/or gearing system 16 are located vehicle centrically or vehicle rearwardly, wherein vehicle 12 comprises three or more axles, wherein two or more secondary axles are used, wherein a combination of these arrangements are used, etc. Thus, while the SDU 26 may be a rear drive unit in the illustrations; this is not required (e.g., it could be a front drive unit in other examples).

Powertrain system 10 may be any power delivery system used to propel the vehicle 12 that includes the engine 14 and gearing system 16. As will be described more below, system 10 may comprise a vehicle having front-wheel drive (FWD) or rear-wheel drive (RWD) capability, plus selective all-wheel drive capability. Again, for purposes of illustration only, FIG. 1 illustrates vehicle 12 selectively operable in a two-wheel drive (2WD) mode and an all-wheel drive (AWD) mode (i.e., when the SDU 26 is engaged).

Engine 14 of powertrain system 10 may be any suitable motor or combination of motors which deliver rotational kinetic energy to the gearing system 16—which energy ultimately is deliverable to the wheels 42-48 via mechanical linkages. Non-limiting engine examples include combustion engines, electric engines, hybrid-electric engines, etc., just to name a few.

Gearing system 16 of powertrain system 10 may comprise a transmission mechanically coupled to engine 14 which may be used to create different gear ratios allowing different trade-offs between torque delivery and rotational speed. According to one non-limiting example, the gearing system 16 comprises a so-called transaxle. The transaxle may comprise multiple transmission gears (not shown) and a differential (not shown) coupled to each of halfshafts 34*a*, 34*b*. Of course, other types of transmissions may be used instead.

Driveline system 20 may form a portion of powertrain system 10—e.g., being coupled to the gearing system 16. According to one example, driveline system 20 comprises the computer 22, power take-off unit (PTU) 24, drive shaft 28, and secondary drive unit (SDU) 26, as discussed above. According to the illustrated example, engagement between gearing system 16 and PTU 24 may be used to change torque delivery to each of wheels 42, 44, 46, 48—e.g., changing from a two-wheel drive (2WD) mode to an all-wheel drive (AWD) mode. Each driveline system component will be described in turn.

Figure 2:
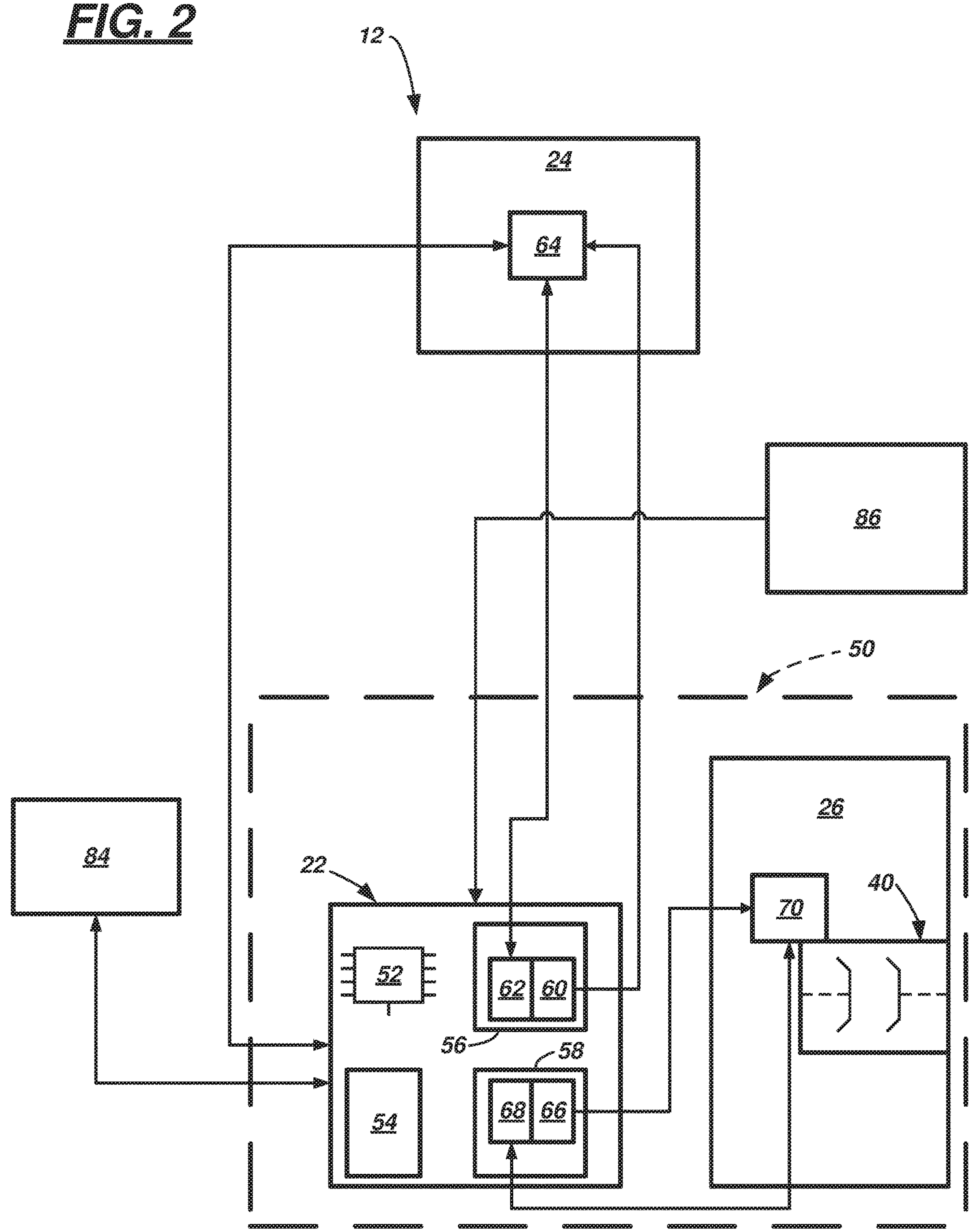
FIG. 2 is an electrical schematic view of the powertrain system shown in FIG. 1.

Turning now to FIG. 2, an electrical architecture diagram of vehicle 12 is shown that includes computer 22. Computer 22 comprises a single computer or multiple computers (e.g., which may or may not be shared with other vehicle systems and/or subsystems). Computer 22 is programmed—at least in part—to monitor sensor data from and/or control aspects of the PTU 24 and/or to monitor sensor data from and/or control aspects of the SDU 26. According to at least one example, computer 22 and SDU 26 share a common housing and collectively comprise a secondary drive module (SDM) 50 (shown in phantom); however, this is not required. In other examples, hardware of computer 22 may be partitioned from SDU 26 and PTU 24 and/or combined with other vehicle components. In addition, in other examples, the computer 22 is located elsewhere in vehicle 12—e.g., not adjacent to or within the same module as SDU 26. Other arrangements are also possible.

Computer 22 may comprise a processor 52, memory 54, a PTU control circuit 56, and a SDU control circuit 58—devices 54-58 each being coupled to the processor 52. Processor 52 can be any type of device capable of processing electronic instructions; non-limiting examples include a microprocessor, a microcontroller or controller, an application specific integrated circuit (ASIC), etc.—just to name a few. Processor 52 may be coupled electronically to memory 54 and circuits 56, 58. In general, computer 22 may be programmed to send data to and/or receive data from circuits 56, 58, as well as to execute digital instructions, which may be stored in memory 54, which enable the computer 22, among other things, to: determine an error within computer 22, determine an error at the PTU 24, determine an error at the SDU 26, control coupling of the PTU 24 to the SDU 26, control the amount of torque transfer from the PTU 24 to the SDU 26, or the like. Other illustrative programmable instructions executable by processor 52 will be discussed in greater detail below.

Memory 54 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 54 may store one or more computer program products which may be embodied as software, firmware, or other programming instructions executable by the processor 52.

PTU control circuit 56 may comprise a PTU power circuit 60 and a PTU sensing circuit 62—each being in communication with the processor 52 and/or one another. Power circuit 60 also may be coupled to a vehicle power source (e.g., such as a battery, not shown) and to an actuator 64 of PTU 24 so that the power circuit 60 may receive electrical power from the power source and manage power delivered to the actuator 64. For example, power circuit 60 may include one or more of a regulator circuit, a power-filtering circuit, a boost or buck converter circuit, an over-voltage protection circuit, and the like. In operation, as explained more below, power circuit 60 may monitor and control voltage and/or current delivered to the PTU 24 (and more particularly to actuator 64 of the PTU 24, which will be described more below). According to a non-limiting example, power circuit 60 may monitor for one or more power draw errors of the actuator 64. Examples of power draw errors include: a voltage level error (e.g., a voltage level, less than a predetermined value, greater than a predetermined value, or outside a threshold range); a current draw level error (e.g., a current draw less than a predetermined value, greater than a predetermined value, or outside a threshold range); a voltage or current stability error (e.g., a measurement of voltage or current for a period of time, wherein during the period, instantaneous values of the current or voltage vary positively or negatively more than a threshold amount); and the like. Other examples exist as well.

PTU sensing circuit 62 may comprise one or more electrical circuits that receive sensor input from sensors located at the PTU 24 and provide this input to the processor 52. As discussed below, based on receiving certain types of sensor data therefrom, processor 52 may execute one or more instructions stored in memory 54 which control the actuator 64 (of PTU 24), an actuator 70 (of SDU 26) (also described below), or a combination thereof. For instance, as explained more below, in response to receiving sensor data, processor 52 may engage or disengage the PTU 24 from the drive shaft 28, engage or disengage the SDU 26 from the drive shaft 28, or both. According to one non-limiting example, sensing circuit 62 may monitor for one or more position errors of actuator 64. Non-limiting examples of PTU position errors include: a state unknown error (e.g., an error indicating that a state of the PTU actuator 64 is unknown—i.e., it is unknown whether the PTU 24 is in an engaged state or a disengaged state); an actuator position error (e.g., an error indicating that the actuator 64 is stuck between the engaged and disengaged states); an out-of-range error (e.g., an error that can be derived from an electrical measurement of the output of actuator 64 indicating that the actuator 64 is outside a threshold range of motion); a responsiveness error (e.g., an error indicating that the responsiveness of actuator 64 (e.g., to computer 22 control) is too slow—e.g., the actuator 64 does not change states as fast as expected); and the like. Other examples exist as well.

SDU control circuit 58 may be similar to the PTU control circuit 56, except that circuit 58 pertains to the SDU 26 rather than the PTU 24. For example, SDU control circuit 58 may comprise an SDU power circuit 66 and an SDU sensing circuit 68—each being in communication with the processor 52 and/or one another. And SDU power circuit 66 also may be coupled to the vehicle power source (not shown) and to actuator 70 (of SDU 26) so that the power circuit 66 may receive electrical power from the power source and manage power delivered to the actuator 70. Like power circuit 60, SDU power circuit 66 may include one or more of a regulator circuit, a power-filtering circuit, a boost or buck converter circuit, an over-voltage protection circuit, and the like. In operation, as explained more below, power circuit 66 may monitor and control voltage and/or current delivered to actuator 70 (of SDU 26). According to a non-limiting example, power circuit 66 may monitor for one or more power draw errors of the actuator 70. Examples of power draw errors include: a voltage level error (e.g., a voltage level, less than a predetermined value, greater than a predetermined value, or outside a threshold range); a current draw level error (e.g., a current draw less than a predetermined value, greater than a predetermined value, or outside a threshold range); a voltage or current stability error (e.g., a measurement of voltage or current for a period of time, wherein during the period, instantaneous values of the current or voltage vary positively or negatively more than a threshold amount); and the like. Other examples exist as well.

SDU sensing circuit 68 may comprise one or more electrical circuits that receive sensor input from sensors located at the SDU 26 and provide this input to the processor 52. Similar to operating PTU 24 (and as will be explained more below), based on receiving certain types of sensor data from the SDU 26, processor 52 may execute one or more instructions stored in memory 54 which control actuator 64 (PTU 24), actuator 70 (SDU 26), or a combination thereof. For instance, as explained more below, in response to received sensor data, processor 52 may engage or disengage the PTU 24 from the drive shaft 28, engage or disengage the SDU 26 from the drive shaft 28, or both. According to a non-limiting example, sensing circuit 68 may monitor for one or more position errors of actuator 70. Non-limiting examples of PTU position errors include: a state unknown error (e.g., an error indicating that a state of the SDU actuator 70 is unknown—i.e., it is unknown whether the clutch 40 of SDU 26 is in an engaged state or a disengaged state); an actuator position error (e.g., an error indicating that the actuator 70 is stuck between the engaged and disengaged states); an out-of-range error (e.g., an error that can be derived from an electrical measurement of the output of actuator 70 indicating that the actuator 70 is outside a threshold range of motion); a responsiveness error (e.g., an error indicating that the responsiveness of actuator 70 and/or clutch 40 (e.g., to computer 22 control) is too slow—e.g., the actuator 70 does not change states as fast as expected); and the like. Other examples exist as well.

As will be described more below, processor 52 of computer 22 also may determine system level errors by receiving and processing additional and/or different sensor data from other sensors which may be located in computer 22, in PTU 24 (e.g., in places other than the actuator 64), and/or in SDU 26 (e.g., in places other than the actuator 70). As will be described below, based on at least one system level or other errors, computer 22 may disengage the SDU 26 from the PTU 24—e.g., temporarily during a current ignition cycle or even permanently for a remaining duration of the current ignition cycle. Non-limiting examples of system level errors include: an operating temperature of any of computer 22, PTU 24, or SDU 26 outside of a respective operating threshold; a calibration completion error (e.g., determining that a calibration of the processor 52, the actuator 64, the actuator 70, or the clutch 40 is not completed or capable of being completed); a processor 52 malfunction (e.g., determining that the processor 52 itself is malfunctioning—e.g., that it is operating slower than a threshold speed, that it is not able to provide digital outputs regarding the actuators 64, 70, or the like); a power draw error of computer 22 (e.g., determining an electrical short in computer 22, or determining that processor 52 or other components of computer 22 are drawing electrical current larger (or smaller) than respective thresholds); a voltage level error at computer 22 (e.g., determining that the processor 52 or other components of computer 22 are receiving as input an adequate electrical voltage (e.g., a minimum threshold value); and a communication status error (e.g., determining that the processor 52 is not coupled to a communication network with the vehicle 12 such as a controller area network (CAN), a local interconnect network (LIN), or the like—none of which are shown). These are just a few examples; others exist as well. Thus, it should be appreciated that if the computer 22 or driveline system 20 itself is experiencing a system level error, then the reliability of other error determinations by the computer 22—of the PTU 24 or the SDU 26—is diminished. System level errors are discussed more below.

Returning to FIG. 1, PTU 24 comprises any suitable hardware component(s) that receive input torque from gearing system 16 and provide output torque to an auxiliary hardware device. In the illustrated example, the PTU 24 provides output torque to at least the SDU 26. For purposes of illustration only (and not intending to be limiting), PTU 24 may comprise an input shaft 80 that is configured to receive a torque input from gearing system 16 and at least one output shaft 82 which may deliver torque output to the SDU 26 via drive shaft 28 when actuator 64 is in an engaged state. As will be described more below, the actuator 64 may be moved between the engaged state and a disengaged state—e.g., controlled by PTU power circuit 60 (of computer 22). Thus, in the engaged state, torque may be transferred from the gearing system 16, through the input and output shafts 80, 82, through the drive shaft 28, through the SDU 26, and to the rear wheels 46, 48.

Actuator 64 may comprise any suitable electronically actuated mechanical linkage between the PTU 24 and the drive shaft 28. For example, the actuator 64 may include a solenoid or other electrical switch which, when selectively actuated by the PTU power circuit 60, mechanically couples the PTU 24 and drive shaft 28 (into the engaged state). Similarly, the PTU 24 and drive shaft 28 may be de-coupled by the PTU power circuit 60 providing a different, predetermined current or voltage level to the actuator 64 (thereby causing the actuator 64 to move the disengaged state).

According to at least one example, the actuator 64 may have more than two positions—e.g., more than an engaged state and a disengaged state. For example, one or more intermediary states of actuator 64 may result in a reduced torque transfer to the SDU 26 (e.g., a torque transfer that is less than a normal normal torque ($\tau_{NORM}$) transfer). In this manner, computer 22 or other control module (not shown) within vehicle 12 may control torque reduction when desirable.

Drive shaft 28 may comprise any suitable mechanical linkage between the PTU 24 and SDU 26 which facilitates the delivery of torque to the SDU 26. Drive shaft 28 may comprise a rigid, elongated rod or member, coupling components such as universal joints, etc. (for coupling to PTU 24 and the SDU 26), and the like, all of which will be appreciated by those skilled in the art.

SDU 26 may comprise any suitable mechanical component at secondary axle 36 which is configured to receive torque from the drive shaft 28 (via clutch 40) and deliver said torque to the wheels 46, 48. SDU 26 may comprise a differential—e.g., so that halfshafts 36*a*, 36*b* (which are coupled thereto) permit wheels 46, 48 to rotate at different rates of speed and/or be delivered different amounts of torque. As discussed above, SDU 26 could be a rear drive unit or be located instead at a front axle (e.g., as a front drive unit; e.g., in rear-wheel drive vehicles).

SDU 26 also may comprise clutch 40 and actuator 70. Clutch 40 may comprise any suitable mechanical component interposed between the SDU 26 and either wheel 46, 48 which may be moved between an engaged state and a disengaged state by actuator 70. According to one example, clutch 40 may comprise a set of braking plates and a set of interstitially-located friction plates, as well as other components and features which facilitate movement of at least one set of the plates toward the other—e.g., so that the clutch moves between an engaged state and an disengaged state. Other aspects of a clutch, as well as assembly and operation techniques, are known in the art. Thus, when clutch 40 is in the engaged state, torque transferred from the PTU 24 and drive shaft 28 to the SDU 26 is then to the wheels 46, 48. And no torque is transferred to wheels 46, 48 when the clutch 40 is in the disengaged state.

The clutch 40 may move between the engaged and disengaged states in response to actuation of actuator 70, and actuator 70 may be controlled by SDU power circuit 66 (of computer 22). According to at least one example, actuator 70 may be similar or identical to actuator 64; therefore, it will not be described in greater detail here.

FIG. 2 illustrates that vehicle 12 also may comprise a human-machine interface (HMI) module 84 and an ignition module 86. The HMI module 84 may include any suitable input and/or output devices such as switches, knobs, controls, etc.—e.g., on a vehicle instrument panel, steering wheel, etc. of vehicle 12—which are coupled communicatively to computer 22. In one non-limiting example, HMI module 84 may comprise an interactive touch screen or display which provides powertrain information (e.g., including text, images, etc.) to the vehicle user, and a switch or knob on the HMI module 84 permits the user to switch between a two-wheel drive (2WD) mode and an all-wheel drive (AWD) or four-wheel drive (4WD) mode (or vice-versa). The HMI module 84 further may be used to notify the user that of a driveline fault, failure, and other diagnostic trouble codes.

The ignition module 86 may comprise a computer that, among other things, monitors a vehicle ignition state with respect to error messages (e.g., diagnostic trouble codes or DTCs). When the cause of an error is resolved, some errors may be cleared during a current ignition cycle; others require cycling (e.g., they may clear only upon a new ignition cycle). As used herein, a latched error type is one which requires a new ignition cycle to be cleared (and of course, the fault or malfunction to be resolved); and as used herein, an unlatched error type is one which may be cleared within the current ignition cycle (e.g., again of course, when the fault or malfunction is resolved).

Figure 3:
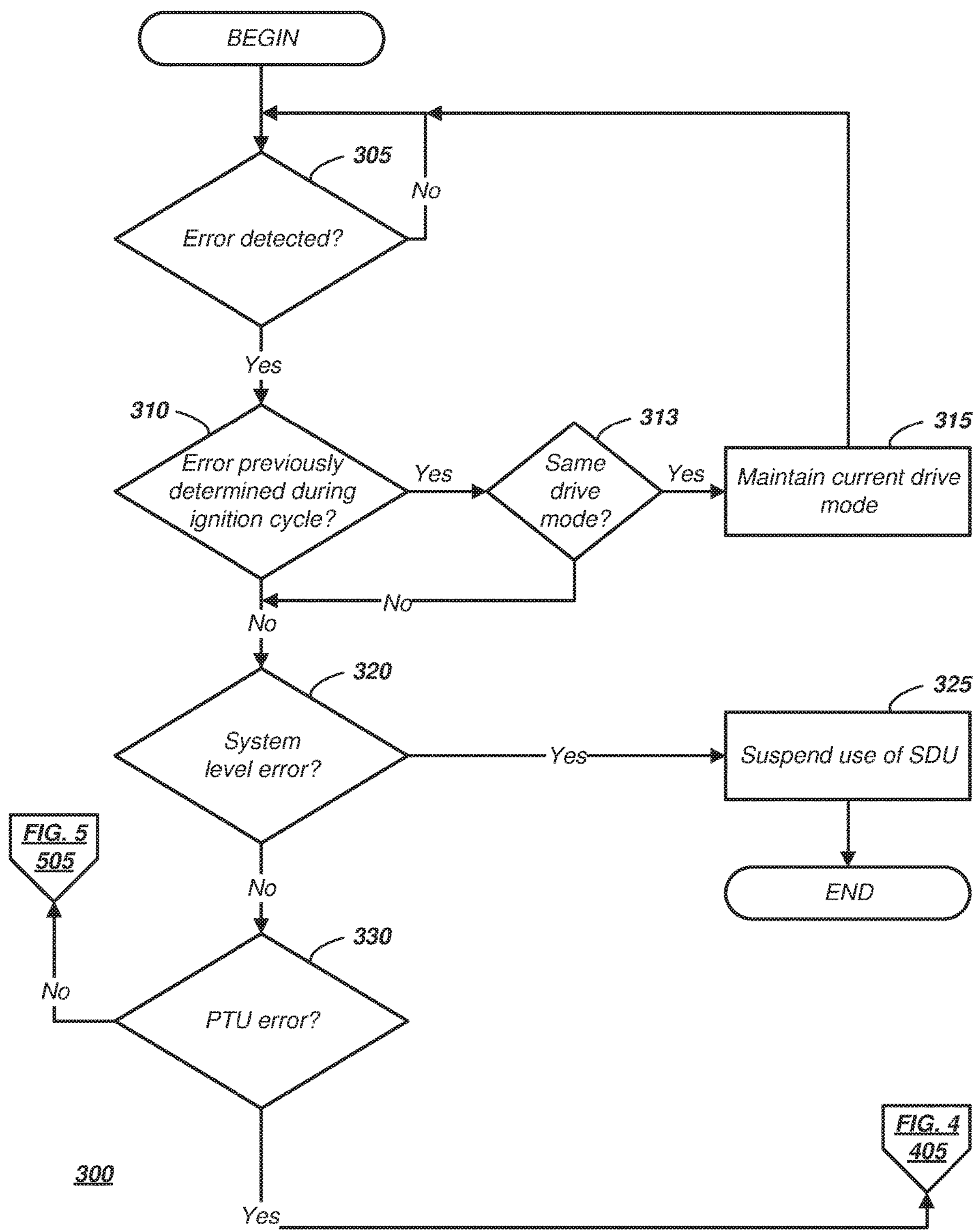
FIGS. 3-5 comprise a flow diagram illustrating a process for determining whether to transfer torque to a secondary drive unit during a driveline error.
Figures 3, 4:
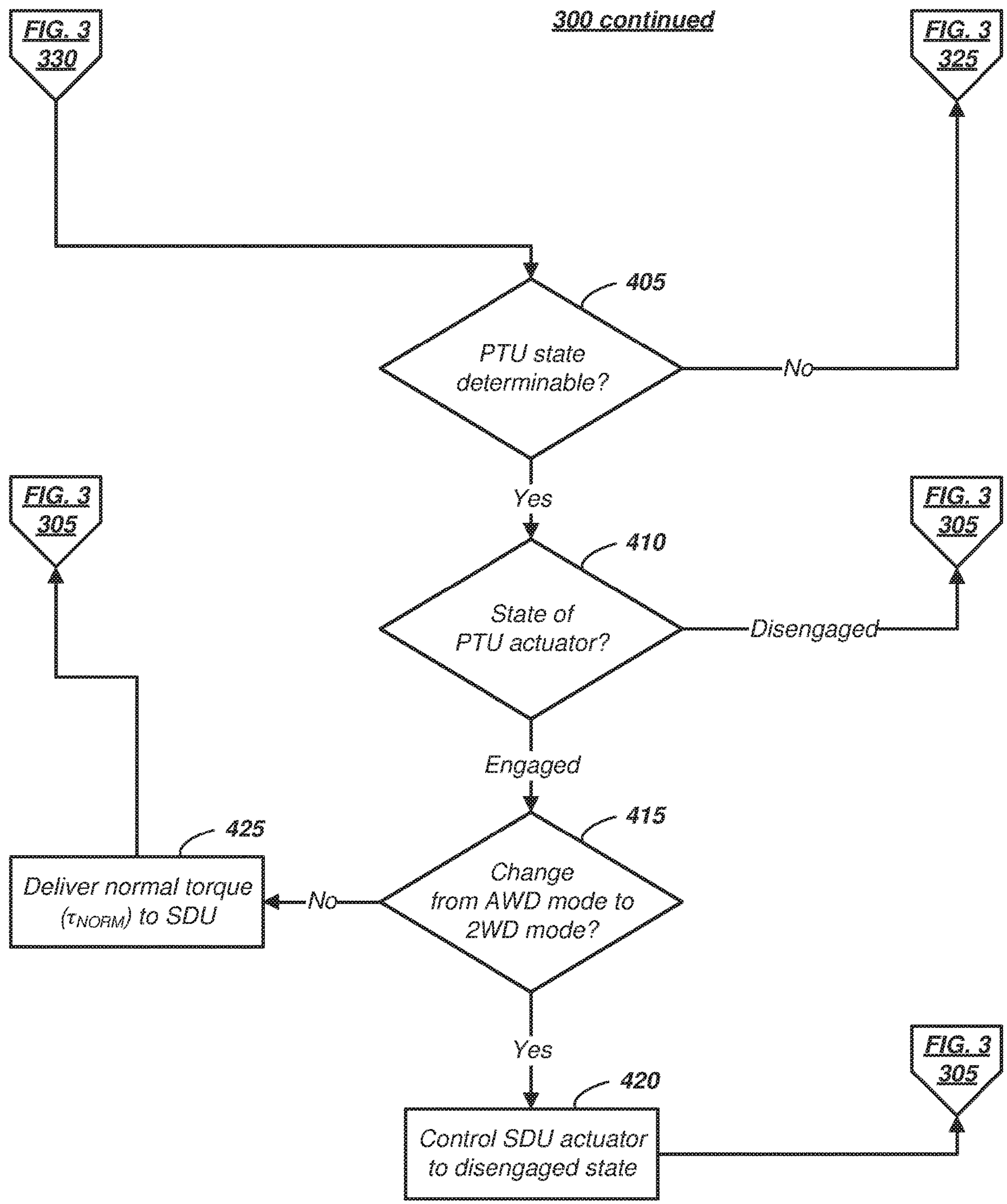
Figures 3, 5:
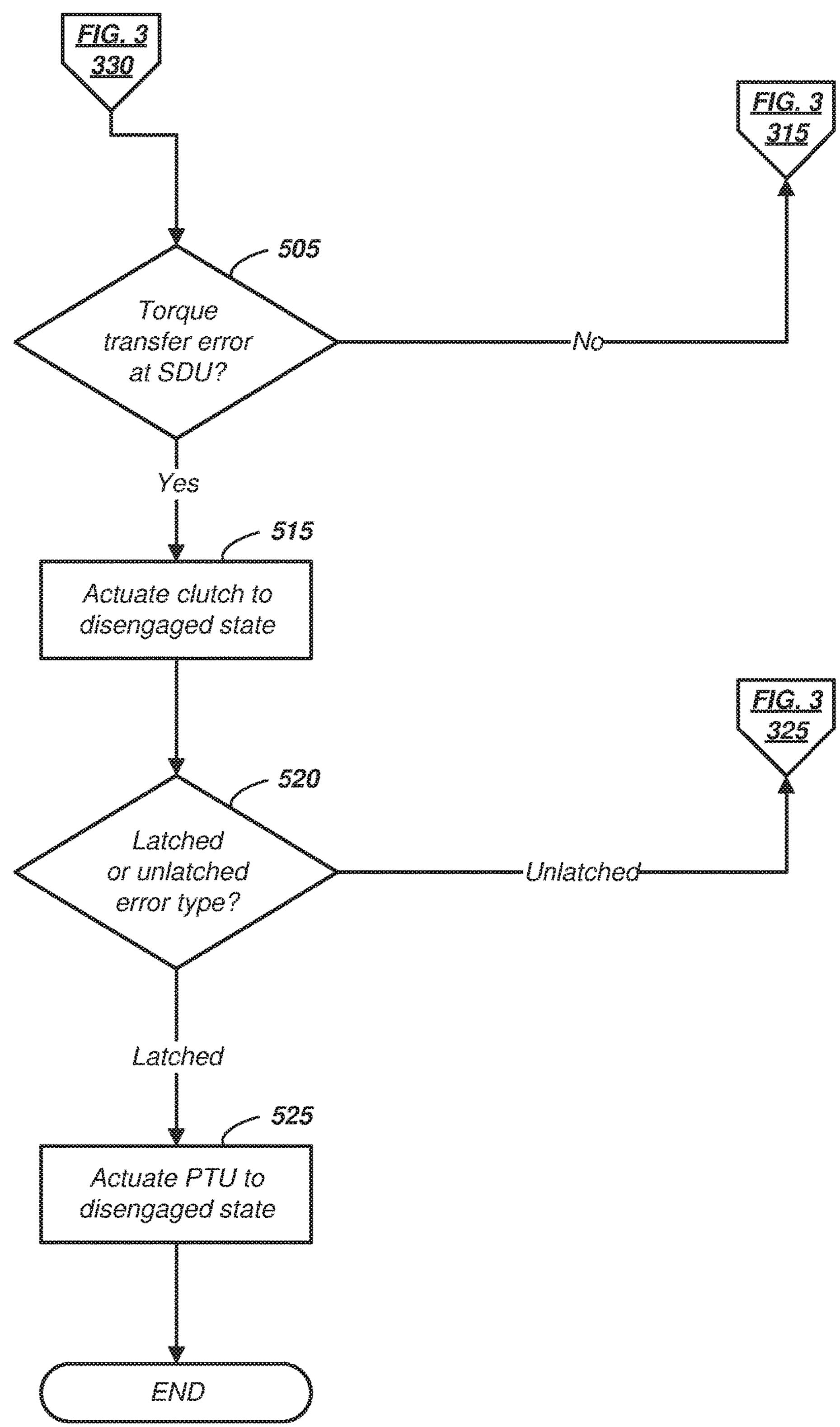

Turning now to FIGS. 3-5, a process 300 is shown for transferring normal torque from the PTU 24 to the SDU 26, even when the PTU 24 experiences an error (and/or a diagnostic trouble code is generated in response to a PTU error). As described above, many PTUs will reduce or cease torque delivery to the SDUs when such an error occurs at the PTU. However, the presently-described powertrain system 10 first quantitatively and/or qualitatively evaluates the detected error, and then, based on the evaluation, the system 10 determines whether to deliver normal torque ($\tau_{NORM}$).

The process 300 begins with instructional block 305 which includes computer 22 determining whether an error has been occurred somewhere within driveline system 20 (e.g., at computer 22, PTU 24, or SDU 26, just to name a few examples). In general, the error may be generated within the powertrain system 10, or in some instances, by other vehicle modules, control systems, electronics, etc. The error may be an intra-vehicle message, a DTC, an electrical measurement, etc. Regardless of the means of how the error is detected, computer 22 may receive an indication of an error within driveline system 20. And upon receiving an indication, process 300 proceeds to block 310. When no indication of an error has been received, then process 300 may loop back and repeatedly execute block 305 (e.g., until such an indication is received). Receiving an indication (of an error) can include determining or making an evaluation at computer 22.

In block 310, computer 22 determines whether the error (of block 305) previously was determined within the current ignition cycle. For example, if the error has been previously determined within the current ignition cycle, then computer 22 proceeds to block 313. And if the error was not previously determined during the current ignition cycle, then process 300 proceeds to block 320.

In block 313, computer 22 determines whether a currently-selected drive mode is the same as a previously-selected drive mode (i.e., when the error was previously determined). When the currently-selected drive mode is the same as the previously-selected drive mode, then process 300 proceeds to block 315. And when the currently-selected drive mode is not the same as the previously-selected drive mode, then process 300 proceeds to block 320 (discussed below).

In block 315, computer 22 determines to maintain a current drive mode of vehicle 12. According to one example, the PTU 24 may be in one of two modes: a 2WD mode (PTU 24 in a disengaged state) or an AWD mode (PTU 24 in an engaged state). Thus, in block 315, computer 22 determines to maintain whatever the current drive mode is (e.g., prior to the current error detection, as the nature and severity of this error is presumed to have been previously addressed by computer 22 and/or another onboard computer). Thus, following block 315, process 300 may loop back and begin by re-executing the programming instructions associated with blocks, 305, 310, etc. (e.g., in order to detect a different error).

As discussed above, process 300 proceeds to block 320 when the error has not been previously determined and addressed by computer 22 (and/or when the error was previously determined, but the drive mode has changed). In block 320, computer 22 determines whether the error is a system level error. According to at least some examples, driveline system level errors are errors in which computer 22 itself may be experiencing a malfunction—e.g., thereby inhibiting the control of other driveline system components (e.g., consequently, the PTU 24, the SDU 26, or other components could be damaged without remedial action). In at least some instances, these errors are associated with the ability of computer 22 to detect or sense errors at the mechanical components of the driveline system 20 (e.g., such as at the PTU 24 and/or the SDU 26). A few non-limiting examples of system level errors include, as explained above: an operating temperature error of computer 22; a calibration completion error; a processor 52 malfunction; a power draw error of computer 22; a voltage level error at computer 22; and a communication status error. In block 320, when the error (of block 305) is determined by computer 22 to be a system level error, then process 300 proceeds to block 325, and when the error is not a system level error, then process 300 proceeds to block 330.

In block 325, computer 22 suspends the use of the SDU 26. According to one example, the vehicle 12 operates only in a 2WD mode for a remainder of the ignition cycle. In this instance, computer 22 may transmit a message to the HMI module 84 to indicate to the driver that the AWD mode is suspended until the vehicle 12 is serviced by an authorized vehicle technician. Thereafter, process 300 may end.

Other examples of block 325 exist as well. In at least one instance, the system level error is mitigated during the current ignition cycle. For example, a communication status error between computer 22 and another control module (e.g., via a CAN bus) may be resolved during a current ignition cycle—e.g., computer 22 and/or the other control module may come back online. In such instances, the suspension of SDU use in block 325 may be temporary, and SDU 26 may be engaged (an AWD mode) during the same ignition cycle. Other examples of system level errors which may be resolved during the same ignition cycle also exist (e.g., a calibration completion error initially could suspend use of SDU 26 but thereafter be completed during current ignition cycle thereby permitting the suspension of SDU use to be temporary).

In block 330, computer 22 may determine whether the error (block 305) is an error originating at the PTU 24. Non-limiting examples of types (or categories) of PTU errors include power draw errors and position errors; e.g., as discussed above, computer 22 may determine whether the error detected in block 305 is one of: a voltage level error, a current draw level error, a voltage or current stability error, a state unknown error, an actuator position error, an actuator out-of-range error, an actuator responsiveness error, or the like. Thus, for example, when computer 22 determines the error to be a power draw error or position error at the PTU 24, then process 300 proceeds to block 405 (FIG. 4). And when computer 22 determines otherwise (i.e., SDU error), then process 300 proceeds to block 505 (FIG. 5).

Turning to FIG. 4, in block 405, computer 22 may determine whether the state of the PTU 24 (e.g., engaged state or disengaged state) is determinable. As used herein, determining whether a state of the PTU 24 (or actuator 64) is determinable means determining, at the computer 22, whether to trust any received electrical data associated with identifying the state of the PTU 24 (or actuator 64). According to one example, in order to determine whether the state of the PTU 24 is determinable, computer 22 qualitatively may determine the PTU error (discussed in block 330). For instance, computer 22 may determine whether the error is an actuator position error. If the error is a position error of actuator 64 (e.g., such as a state unknown error, an actuator position error, an actuator out-of-range error, an actuator responsiveness error, or the like), then computer 22 may determine that any sensed or determined information regarding the state of PTU 24 is untrustworthy—e.g., even if some electrical data received at the computer 22 could be interpreted otherwise. Accordingly, in block 405, the process 300 may loop back to block 325 and use of SDU 26 may be suspended—e.g., for the duration of the ignition cycle or any other suitable duration.

If the PTU error is a power draw error (e.g., a voltage level error, a current draw level error, a voltage or current stability error, or the like)—and does not include a position error, then process 300 may proceed to block 410. In this instance, while computer 22 has detected some type of error, computer 22 may maintain control over the PTU engagement and disengagement, and therefore, no torque reduction may be necessary.

In block 410, computer 22 may determine whether the state of the PTU 24 is engaged or disengaged. If computer 22 determines that actuator 64 is in the engaged state (e.g., vehicle 12 is in AWD mode) then process 300 proceeds to block 415. If computer 22 determines that actuator 64 is in the disengaged state (e.g., vehicle 12 is in 2WD mode), then process 300 may proceed to block 305 (FIG. 3). In this latter instance, if the driver switches from 2WD mode to AWD mode (or a traction control system switches the vehicle 12 to AWD mode), the process 300 may proceed from block 305 to block 315 (e.g., maintaining the AWD mode, as the error was previously determined (block 310) during the current ignition cycle).

In block 415, computer 22 determines to change from the AWD mode to the 2WD mode. According to one example, computer 22 receives a manual input via HMI module 84 indicating a driver's desire to change modes (e.g., AWD mode to 2WD mode). According to another example, as discussed above, computer 22 determines to change modes based electronic sensing of traction-control conditions and determining that the conditions are no longer suitable for the all-wheel drive mode use (e.g., by detecting wheel slip less than a predetermined threshold, detecting dry roadways, etc.). When computer 22 determines to change modes in block 415, then process 300 proceeds to block 420. And when computer 22 determines not to change modes, then process 300 may proceed to block 425.

In block 420, computer 22 sends an instruction to the actuator 70 to change states from the engaged state to the disengaged state. Thus, while SDU 26 may continue to receive an input torque via propshaft 28, no torque is transferred, via halfshafts 36*a*, 36*b*, to the wheels 46, 48. Accordingly, the vehicle 12 changes to the 2WD mode from the AWD mode. Following block 420, the process 300 may loop back and repeat block 305, as described above.

In block 425, computer 22 continues to maintain the actuator 64 in the engaged state, and also controls the PTU 24 so that PTU 24 delivers normal torque ($\tau_{NORM}$) in spite of the detected error at the PTU 24 (i.e., normal torque ($\tau_{NORM}$) is transferred during the error (or before the error is cleared, as discussed below)). According to one example, the computer 22 may control the actuator 64 to the engaged state—e.g., as opposed to transferring a reduced torque via an intermediary state. According to another example, computer 22 may send an instruction (e.g., over a communication bus or discrete link) to another control module in vehicle 12, wherein the instruction overrides any torque reduction transfer instruction by such a module to the PTU 24. In some vehicles, the PTU 24 or gearing system 16 may be connected to and/or controlled (at least in part) by a second computer (not shown), and this second computer may actuate torque reduction when an error at the PTU 24 is determined. According to at least one example, the second computer is manufactured by a vehicle component or system manufacturer that is different from a manufacturer of the SDU 26. Thus, in at least one example, computer 22 may transmit an override instruction, when computer 22 determines the nature of the PTU error, as described above.

According to another example of block 425, the computer 22 may determine that conditions remain suitable for the AWD mode, and therefore, computer 22 controls PTU 24 to maintain normal torque ($\tau_{NORM}$) transfer. For example, computer 22 may maintain the AWD mode based on receiving an indication that electronic traction control sensing indicates roadways having a threshold slipperiness (or the like). Still other examples exist of computer 22 controlling PTU 24 so that normal torque ($\tau_{NORM}$) is transferred in spite of the detected error at the PTU 24. Following block 425, the process 300 may loop back and repeat block 305, as described above.

Turning now to FIG. 5, recall that process 300 proceeds from block 330 (FIG. 3) to block 505 (FIG. 5) when the computer 22 determines that the detected error is not originating at the PTU 24. According to one example, within process 300, if the error within driveline system 20 is not a system level error (block 320) and is not a PTU error (block 330), then by default it is an SDU error.

Block 505 qualitatively evaluates the nature of the SDU error. For example, if the SDU error is a torque transfer error, then the process 300 proceeds to block 515, else the process proceeds to block 315. As used herein, a torque transfer error at the SDU 26 includes at least one of several types of errors: (a) an error detection resulting from a mechanical failure to transfer torque from the SDU 26 to the secondary axle 36 (or halfshafts 36*a*, 36*b*)—e.g., receiving an indication that the clutch 40 is engaged, that the drive shaft 28 is being driven by the PTU 24, but no torque is being delivered to the respective halfshafts 36*a*, 36*b* (this is simply an example of a mechanical failure; other examples exist); (b) a position error of actuator 70 (non-limiting examples are cited above)—e.g., wherein computer 22 cannot determine the engaged state or disengaged state of the actuator 70 or the clutch 40; or (c) a power draw error that includes insufficient voltage, current, or both to control actuator 70. Thus, if the SDU error is another type of error including some power draw errors which still permit the actuator 70 to move between the engaged and disengaged states (e.g., which permit mechanical torque transfer through the SDU 26, etc.), then process 300 proceeds to block 315. As discussed above, in block 315, computer 22 maintains the present mode (e.g., 2WD or AWD), and thereafter loops back to block 305.

In block 515, computer 22 may attempt to actuate, via actuator 70, the clutch 40 to the disengaged state. In this manner, the SDU 26 may be inhibited from damage incurred when computer 22 has experienced a loss of control, as discussed above.

Following block 515 (in block 520), computer 22 may determine whether the type of error determined in the process described above is a latched error type or an unlatched error type. If computer 22 determines that the error type is unlatched, then process 300 proceeds to block 325 (FIG. 3). As described above, block 325 may suspend use of the SDU 26—e.g., in this case, until the error detected in block 305 (and determined in block 520 to be an unlatched error type) is cleared (i.e., no longer a malfunction). And if in block 520 computer 22 determines that the error type is latched, then process 300 proceeds to block 525.

In block 525, since the error type is determined to be latched, a new ignition cycle will be needed to clear the error. As the clutch 40 may have been previously actuated to a disengaged state (block 515), no torque transfer may be occurring to the wheels 46, 48 (of the secondary axle 36). However, in at least some instances, a powertrain or transmission control module (not shown) may still be driving the input shaft 80 of the PTU 24. Consequently, the PTU 24 may be in the engaged state—driving the output shaft 82, even though no torque is being transferred to the secondary axle 36. Under these circumstances, computer 22 may be unable to override the gearing system 16 (which provides torque to input shaft 80), but it may control the actuator 64 and change the PTU 24 a disengaged state—thereby disconnecting the driven drive shaft 28 and conserving energy. Following block 525, the process 300 may end.

Other examples of the process described above also exist. According to one example of process 300, the instructions stored in memory 54 of computer 22 may permit instructional block 525 to be overridden by another onboard computing system. For example, following disengagement of the clutch 40, per block 515, PTU 24 may be selectively switchable to the disengaged state (block 525) or alternatively, maintain the engaged state (e.g., skip or ignore instruction block 525). According to at least one example, a vehicle manufacturer or other original equipment manufacturer (OEM) may be granted, in software, authority to inhibit computer 22 from executing block 525. In at least one example, this override may conditional—e.g., inhibiting the computer 22 from actuating the PTU 24 to the disengaged state following the computer 22 actuating the clutch 40 of the SDU 26 to the disengaged state (in block 515) and computer 22 determining a latched error type (block 520). In such instances, computer 22 may determine that its actuation of the PTU 24 to the disengaged state has been inhibited.

According to another example, process 300 could be executed concurrently for different errors. Further, any single error could cause a suspension of use of the SDU 26 for a remainder of a current ignition cycle.

Thus, there has been described a powertrain system for a vehicle. The system includes a driveline system that includes a power-take off unit (PTU), a secondary drive unit (SDU), and a computer programmed with instructions that cause the PTU to transfer normal torque to the SDU even when an error message is determined at the PTU and/or SDU.

In general, the computing systems and/or devices described may employ any of a number of computer operating systems, including, but by no means limited to, versions and/or varieties of the Windows Embedded Automotive operating system, the Microsoft Windows operating system, the Unix operating system, the AIX UNIX operating system, the Linux operating system, the Mac OSX and iOS operating systems, or the like. Examples of computing devices include, without limitation, an on-board vehicle computer or some other computing system and/or device on vehicle 12.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., such as computer 22), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. As described herein, the processor instructs vehicle components to actuate in accordance with the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method for controlling a vehicle driveline system, comprising:

determining an error within the system;

following the error, determining that a state of a power take-off unit (PTU) within the system is determinable, wherein determining that the state of the PTU is determinable comprises determining whether to trust any received electrical data associated with identifying the state of the PTU; and then transferring a torque from the PTU to a secondary drive unit (SDU) during the error.

2. The method of claim 1, wherein the error occurs at the PTU, wherein the torque is a normal torque, wherein transferring the normal torque from the PTU to the SDU comprises transferring a determined or predetermined quantity of torque which the PTU otherwise would transfer in an absence of the error or in an absence of a PTU diagnostic trouble code (DTC).

3. The method of claim 1, further comprising: prior to transferring the torque, determining the state of the PTU, wherein the state comprises one of an engaged state or a disengaged state.

4. The method of claim 1, further comprising: determining that the state is determinable based on determining that the error is a position error at the PTU or a power draw error at the PTU.

5. The method of claim 1, further comprising:

determining that the state of the PTU is an engaged state; and then controlling the PTU to transfer the torque to the SDU.

6. The method of claim 5, wherein controlling the PTU to transfer the torque to the SDU comprises at least one of: outputting from a computer a torque reduction override instruction, or controlling an actuator at the PTU to deliver the torque.

7. The method of claim 1, further comprising: after determining the error, transferring the torque to the SDU, based at least in part on electronic traction control sensing.

8. The method of claim 1, further comprising:

after determining the error, receiving an indication of a driver input to change to a two-wheel drive (2WD) mode; and then controlling an actuator of the SDU to change to the 2WD mode.

9. A system for controlling a vehicle driveline, comprising:

a computer, comprising a processor and memory storing instructions executable by the processor, the instructions comprising, to:

determine an error within the system; and following the error, determine that a state of a power take-off unit (PTU) is determinable; and then, transfer a torque from the PTU to a secondary drive unit (SDU) during the error, wherein determining that the state of the PTU is determinable comprises determining whether to trust any received electrical data associated with identifying the state of the PTU.

10. The system of claim 9, wherein the error occurs at the PTU, wherein the torque is a normal torque, wherein transferring the normal torque from the PTU to the SDU comprises transferring a determined or predetermined quantity of torque which the PTU otherwise would transfer in an absence of the error or in an absence of a PTU diagnostic trouble code (DTC).

11. The system of claim 9, wherein the state comprises one of an engaged state or a disengaged state.

12. The system of claim 9, wherein the instructions further comprise, to:

determine that the state of the PTU is an engaged state; and then control the PTU to transfer the torque to the SDU.

13. The system of claim 12, wherein controlling the PTU to transfer the torque to the SDU further comprises at least one of the instructions, to: output a torque reduction override instruction, or control an actuator at the PTU to transfer the torque.

14. The system of claim 9, wherein the instructions further comprise, to:

receive an indication of electronic traction control sensing; and after determining the error, transfer the torque to the SDU, based, at least in part, on the sensing.

15. The system of claim 9, wherein the instructions further comprise, to:

receive an indication of a driver input to change to a two-wheel drive (2WD) mode; and then control an actuator of the SDU to change to the 2WD mode.

16. The system of claim 9, wherein the instructions further comprise, to:

prior to determining that the error occurred within the system, determine whether the error was a system level error; and when the error is a system level error, then suspend use of the SDU.

17. The system of claim 16, wherein the instructions further comprise, to:

suspend use of the SDU for a remainder of a current ignition cycle when a type of the error is a latched error type; and provided the error is first cleared, suspend use of the SDU for a portion of the current ignition cycle when the type of the error is an unlatched error type.

18. A vehicle driveline system, comprising:

a secondary drive unit (SDU); and a computer, comprising a processor and memory storing instructions executable by the processor, the instructions comprising, to:

determine an origin of an error in the vehicle driveline system;

when the origin of the error occurs in a power take-off unit (PTU), then determine that a state of the PTU is determinable, wherein determining that the state of the PTU is determinable comprises determining whether to trust any received electrical data associated with identifying the state of the PTU; and when the state of the PTU is determinable, then transfer a torque from the PTU to the SDU during the error.

19. The system of claim 18, wherein the instructions further comprise, to:

when the origin of the error occurs in the SDU, then disengage a clutch of the SDU;

determine a type of the error is one of a latched type error or an unlatched type error; and when the type is the latched type error, then actuate the PTU to a disengaged state so that a drive shaft of the system is not driven by the PTU while the clutch is disengaged.

20. The system of claim 18, wherein the instructions further comprise, to:

when the origin of the error occurs in the SDU, then disengage a clutch of the SDU;

determine a type of the error is a latched type error; and then determine that an actuation of the PTU to a disengaged state has been inhibited.

21. The system of claim 18, wherein transferring the torque to the SDU further comprises at least one of the following instructions: to output from the computer a torque reduction override instruction, or to control an actuator at the PTU to deliver the torque.

* * * * *